US012409813B2

(12) United States Patent
Takemoto et al.

(10) Patent No.: US 12,409,813 B2
(45) Date of Patent: Sep. 9, 2025

(54) TRACTOR

(71) Applicant: Kubota Corporation, Osaka (JP)

(72) Inventors: Hiroki Takemoto, Osaka (JP); Satoshi Nagata, Osaka (JP); Masaru Shinya, Osaka (JP); Ryuichi Inoue, Osaka (JP)

(73) Assignee: Kubota Corporation, Osaka (JP)

( * ) Notice: Subject to any disclaimer, the term of this patent is extended or adjusted under 35 U.S.C. 154(b) by 404 days.

(21) Appl. No.: 18/050,468

(22) Filed: Oct. 28, 2022

(65) Prior Publication Data

US 2023/0166699 A1   Jun. 1, 2023

(30) Foreign Application Priority Data

Sep. 30, 2021  (JP) ................. 2021-162216

(51) Int. Cl.
| | |
|---|---|
| *B60T 7/06* | (2006.01) |
| *B60T 13/14* | (2006.01) |
| *B62D 25/08* | (2006.01) |
| *B62D 49/06* | (2006.01) |

(52) U.S. Cl.
CPC .............. *B60T 7/06* (2013.01); *B62D 25/082* (2013.01); *B62D 49/0692* (2013.01); *B60T 13/142* (2013.01)

(58) Field of Classification Search
CPC .......... B60T 7/06; B60T 13/142; B60T 7/065; B60T 11/18; B62D 25/082; B62D 49/0692
See application file for complete search history.

(56) References Cited

U.S. PATENT DOCUMENTS

| | | | | | |
|---|---|---|---|---|---|
| 4,386,537 | A | * | 6/1983 | Lewis ..................... | B60T 7/06 |
| | | | | | 74/516 |
| 6,155,393 | A | * | 12/2000 | Goto ....................... | B60T 7/06 |
| | | | | | 192/13 R |
| 6,666,105 | B2 | * | 12/2003 | Wachi ..................... | G05G 1/30 |
| | | | | | 74/512 |

(Continued)

FOREIGN PATENT DOCUMENTS

| | | | |
|---|---|---|---|
| CN | 110901608 A | * | 3/2020 |
| EP | 0928727 B1 | * | 2/2002 |

(Continued)

OTHER PUBLICATIONS

Translated copy of JP-S579656-U (Year: 2025).*

(Continued)

*Primary Examiner* — James A Shriver, II
*Assistant Examiner* — Ian Bryce Shelton
(74) *Attorney, Agent, or Firm* — Osha Bergman Watanabe & Burton LLP

(57) ABSTRACT

A tractor includes: a vehicle body; an engine compartment; a driving unit that: is disposed behind the engine compartment, and includes: a brake pedal that includes: a support shaft; and a pedal arm portion; a master cylinder that is operated by the brake pedal and disposed further toward a vehicle-body back side than the support shaft; and a return spring that biases the brake pedal to swing back to a brake off position; and a partition that: is disposed further toward a vehicle-body front side than the brake pedal, and separates the engine compartment and the driving unit from each other, the return spring being engaged to the partition and to the pedal arm portion.

5 Claims, 9 Drawing Sheets

(56) References Cited

U.S. PATENT DOCUMENTS

| | | | | |
|---|---|---|---|---|
| 8,226,175 | B2* | 7/2012 | Drott | B60T 8/4077 |
| | | | | 303/114.3 |
| 9,821,777 | B2* | 11/2017 | Uchida | B60T 7/065 |
| 10,112,587 | B2* | 10/2018 | Richards | G05G 1/30 |
| 11,794,708 | B2* | 10/2023 | Takenaka | B60T 7/06 |
| 11,919,492 | B2* | 3/2024 | Ishino | B60T 7/042 |
| 2012/0031220 | A1* | 2/2012 | Seki | B60T 7/065 |
| | | | | 74/512 |
| 2016/0244033 | A1* | 8/2016 | Uchida | G05G 1/327 |
| 2016/0273630 | A1* | 9/2016 | Ogawa | G05G 5/05 |
| 2017/0174189 | A1* | 6/2017 | Richards | B60T 7/042 |
| 2019/0092289 | A1* | 3/2019 | Abe | B60T 7/065 |
| 2021/0213925 | A1* | 7/2021 | Ishino | B60T 7/12 |
| 2022/0080936 | A1* | 3/2022 | Takenaka | B60T 8/32 |

FOREIGN PATENT DOCUMENTS

| | | | | | |
|---|---|---|---|---|---|
| EP | 1182108 | A1 * | 2/2002 | | B60T 11/08 |
| EP | 2957471 | A1 * | 12/2015 | | B60T 11/16 |
| JP | S579656 | U * | 1/1982 | | |
| JP | S5713362 | U | 1/1982 | | |
| JP | 2000313319 | A * | 11/2000 | | |
| JP | 2003084847 | A * | 3/2003 | | |
| JP | 2005343314 | A * | 12/2005 | | |
| WO | WO-2008102231 | A2 * | 8/2008 | | B60R 21/09 |
| WO | WO-2017147727 | A1 * | 9/2017 | | B60K 26/02 |

OTHER PUBLICATIONS

Translated copy of CN-110901608-A (Year: 2025).*
Extended European Search Report issued in corresponding European Patent Application 22203945.5 dated Apr. 11, 2023 (8 pages).

* cited by examiner

TRACTOR

BACKGROUND

Technical Field

The present invention relates to a tractor.

Description of Related Art

As illustrated in patent literature 1 for example, among tractors, there are tractors that are provided with a driving unit having a brake pedal, a master cylinder operated by the brake pedal, and a return spring that biases the brake pedal to swing back to a brake off position. In these tractors, the master cylinder is provided on a vehicle-body back side of a support shaft (horizontal shaft) of the brake pedal, and the return spring is engaged to a pedal arm portion (swing arm) of the brake pedal and to a cylinder case.

PRIOR-ART LITERATURE

[Patent Literature 1] JP S57-9656 U

Conventionally, the return spring is engaged to the pedal arm portion (swing arm) of the brake pedal and to the cylinder case. As such, the return spring enters a state of being extended to a master-cylinder side from the pedal arm portion of the brake pedal.

SUMMARY

One or more embodiments of the present invention provide a tractor that can keep a return spring from extending to a master-cylinder side while providing the master cylinder on a vehicle-body back side of a support shaft of a brake pedal and keep a structure of engaging the return spring simple.

A tractor of one or more embodiments of the present invention is provided with: a vehicle body; an engine compartment; and a driving unit that is provided behind the engine compartment and has a brake pedal, a master cylinder operated by the brake pedal, and a return spring that biases the brake pedal to swing back to a brake off position; wherein the master cylinder is disposed further toward a vehicle-body back side than a support shaft of the brake pedal, provided is a partition member (i.e., a partition) that is disposed further toward a vehicle-body front side than the brake pedal and separates the engine compartment and the driving unit from each other, and the return spring is engaged to the partition member and to a pedal arm portion of the brake pedal.

According to the present configuration, the return spring engages to the pedal arm portion and the partition member disposed further toward the vehicle-body front side than the brake pedal. As such, the return spring is kept from extending to a master-cylinder side from the pedal arm portion. The partition member is used as a member whereto the return spring is engaged. As such, a structure of engaging the return spring is obtained in a simple state requiring no special engaging member.

In one or more embodiments of the present invention, a portion of the partition member corresponding to a footboard of the brake pedal is disposed further toward a vehicle-body front side than a portion of the partition member corresponding to the support shaft.

According to the present configuration, a space wherein the brake pedal is depressed and moved can be extended to a vehicle-body front side further than the support shaft. As such, a footwell of the driving unit can be widened.

In one or more embodiments of the present invention, the return spring is constituted by a torsion coil spring, and the torsion coil spring is supported by the support shaft with a coil portion being engaged with the support shaft.

According to the present configuration, the coil portion is supported by the support shaft, and the return spring stably imparts to the brake pedal a biasing force of biasing the brake pedal to the brake off position. As such, the brake pedal can be accurately biased to the brake off position by the return spring without requiring a special support member supporting the coil portion.

In one or more embodiments of the present invention, a first arm extending from one end side of the torsion coil spring is engaged with the partition member and a second arm extending from another end side of the torsion coil spring is engaged with the pedal arm portion of the brake pedal, the second arm on the other end side is provided with a bent end portion that engages with the pedal arm portion, the pedal arm portion is provided with a through hole which the bent end portion engages, and the through hole is configured such that the bent end portion can be inserted into the through hole in a direction along a shaft core of the support shaft.

According to the present configuration, the torsion coil spring biases the brake pedal to swing by using the partition member as a reaction-force point. As such, the brake pedal can be accurately biased to the brake off position by the torsion coil spring.

According to the present configuration, an assembly method can be adopted wherein as the brake pedal is fitted to the support shaft, the bent end portion enters the through hole and engages the pedal arm portion. This facilitates assembly of the brake pedal.

DETAILED DESCRIPTION OF EMBODIMENTS

Embodiments of the present invention are described below based on the drawings.

Figure 1:
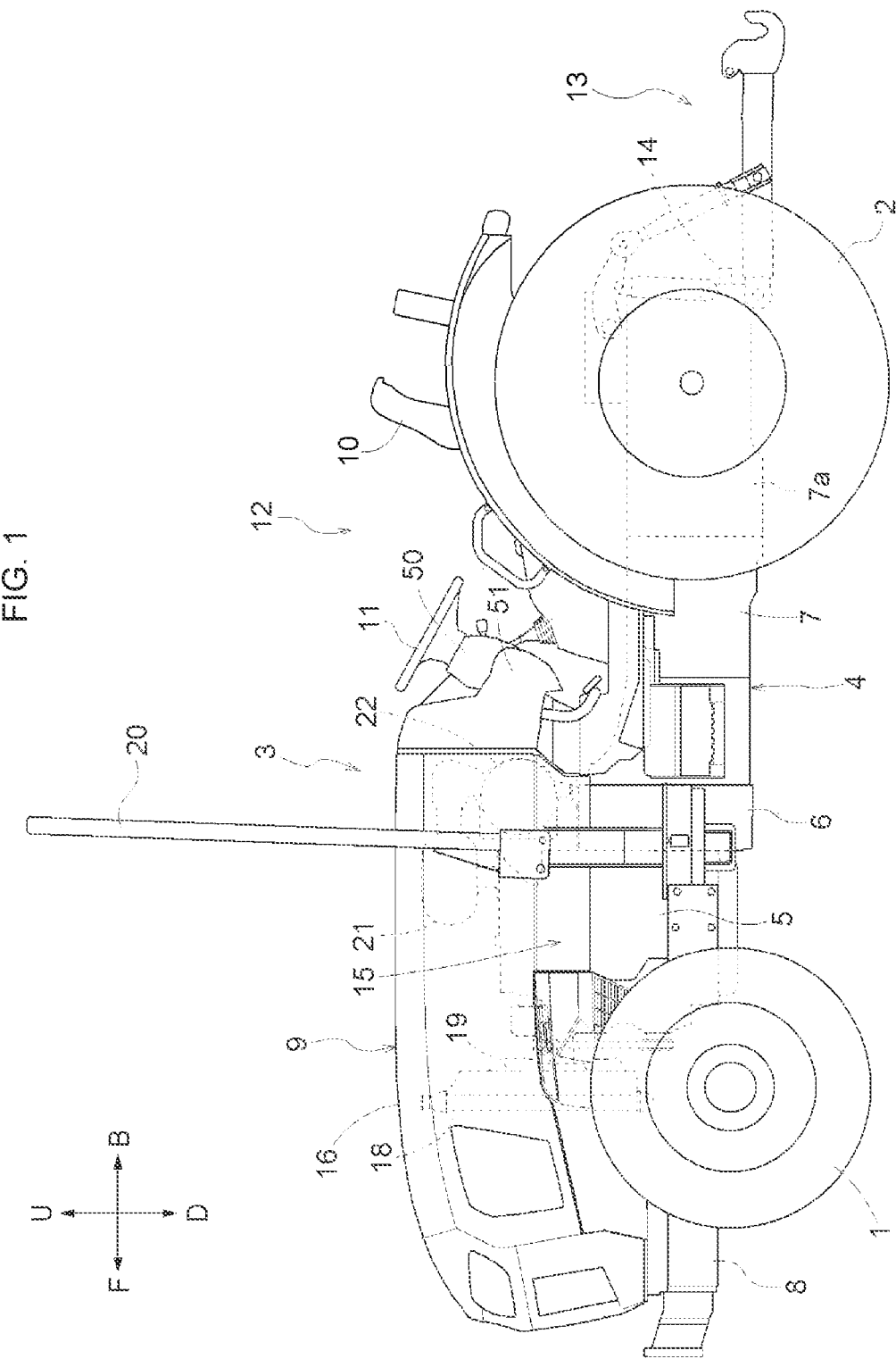
FIG. 1 is a left side view illustrating an entirety of a tractor.

Note that in the following description, in regards to a traveling vehicle body of a tractor, the direction of arrow F illustrated in FIG. 1 is defined as "vehicle-body front", the direction of arrow B is defined as "vehicle-body back", the direction of arrow U is defined as "vehicle-body up", the direction of arrow D is defined as "vehicle-body down", the direction heading toward the surface of the page is defined as "vehicle-body left", and the direction heading toward the reverse face of the page is defined as "vehicle-body right".

[Overall Configuration of Tractor]

As illustrated in FIG. 1, the tractor is provided with a traveling vehicle body 3 supported by a pair of left and right front wheels 1, which can be steered and driven, and a pair of left and right back wheels 2, which can be driven. A vehicle body frame 4 of the traveling vehicle body 3 is constituted by an engine 5, a flywheel housing 6 connected to a back portion of the engine 5, a clutch housing 7 connected to a back portion of the flywheel housing 6, a transmission case 7a connected to a back portion of the clutch housing 7, and a front frame 8 connected to a lower portion of the engine 5. A motor unit 9 provided with the engine 5 is formed in a front portion of the traveling vehicle body 3. A driving unit 12, which is provided with a driver's seat 10 and with a steering wheel 11 whereby a steering operation of the front wheels 1 is performed, is formed in a back portion of the traveling vehicle body 3. A linking mechanism 13, which connects a work apparatus such as a rotary tilling apparatus (not illustrated) in a manner enabling a raising and lowering operation of the work apparatus, and a power takeoff shaft 14, which takes power from the engine 5 and outputs this to the connected work apparatus, are provided in a back portion of the transmission case 7a. Reference numeral 20 illustrated in FIG. 1 is a ROPS frame.

[Configuration of Motor Unit]

Figure 2:
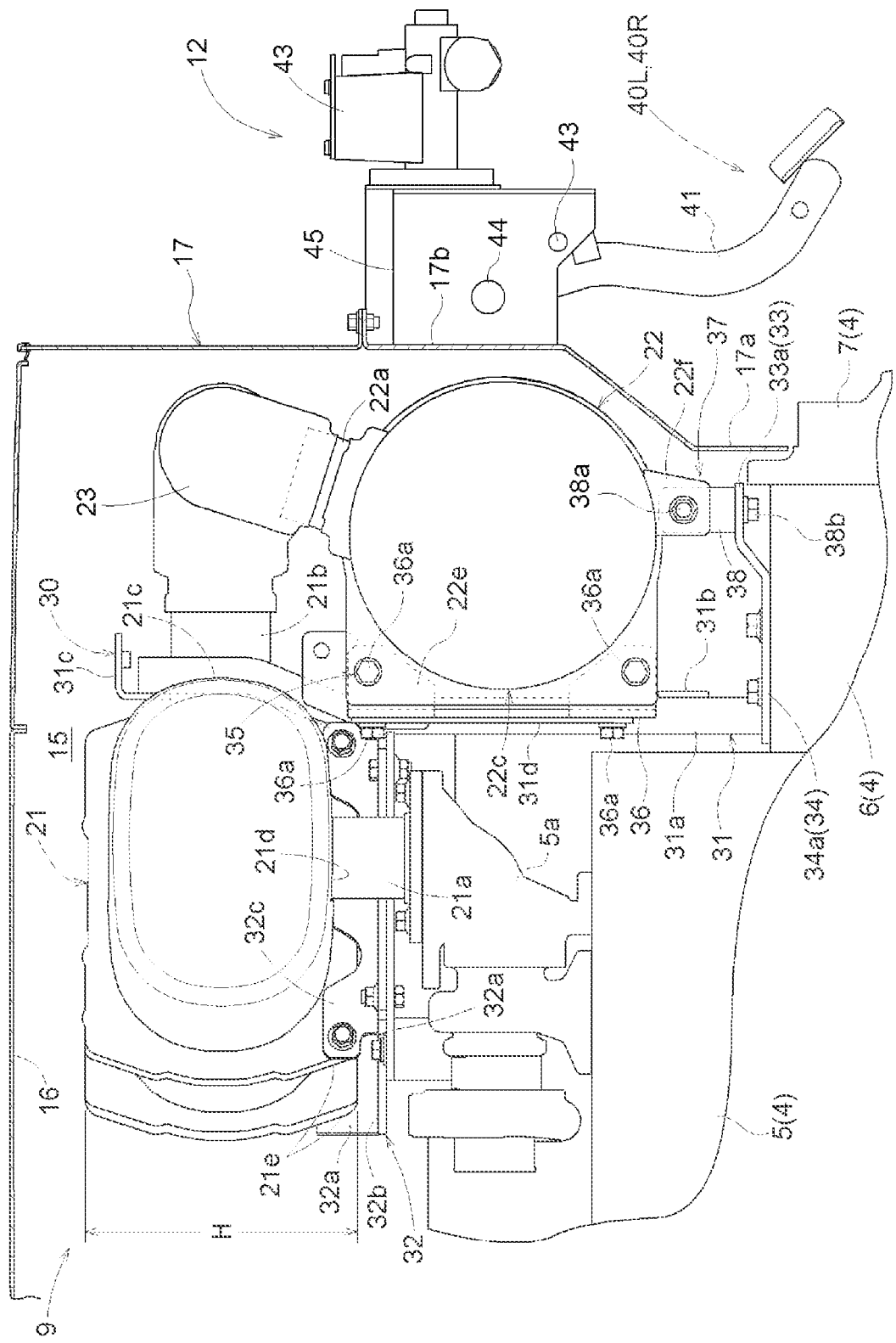
FIG. 2 is a left side view illustrating a first exhaust-gas cleaning device and a second exhaust-gas cleaning device.

As illustrated in FIGS. 1 and 2, the motor unit 9 is provided with an engine compartment 15. The engine compartment 15 is formed by an engine bonnet 16, which covers the engine compartment 15 from above and the front; a partition member 17 that forms a partition between the engine compartment 15 and the driving unit 12; and the like.

As illustrated in FIGS. 1 and 2, the engine 5, a radiator 18 that cools the engine 5, and a first exhaust-gas cleaning device (DPF) 21 and second exhaust-gas cleaning device (SCR) 22 that perform cleaning processes of exhaust gas exhausted by the engine 5 are provided in the engine compartment 15.

[Configuration of Radiator]

As illustrated in FIG. 1, the radiator 18 is provided in front of the engine 5. A blowing action of a rotary fan 19 positioned between the radiator 18 and the engine 5 introduces cooling air from outside the engine compartment 15 to inside the engine compartment and supplies the cooling air to the radiator 18. The cooling air is supplied to the radiator 18 in a state of the cooling air passing through the radiator 18 from front to back. In the radiator 18, engine cooling water is cooled by heat exchange between the supplied cooling air and the engine cooling water. The engine 5 is cooled by the cooled engine cooling water being supplied to the engine 5.

[Configurations of First Exhaust-Gas Cleaning Device and Second Exhaust-Gas Cleaning Device]

Figure 3:
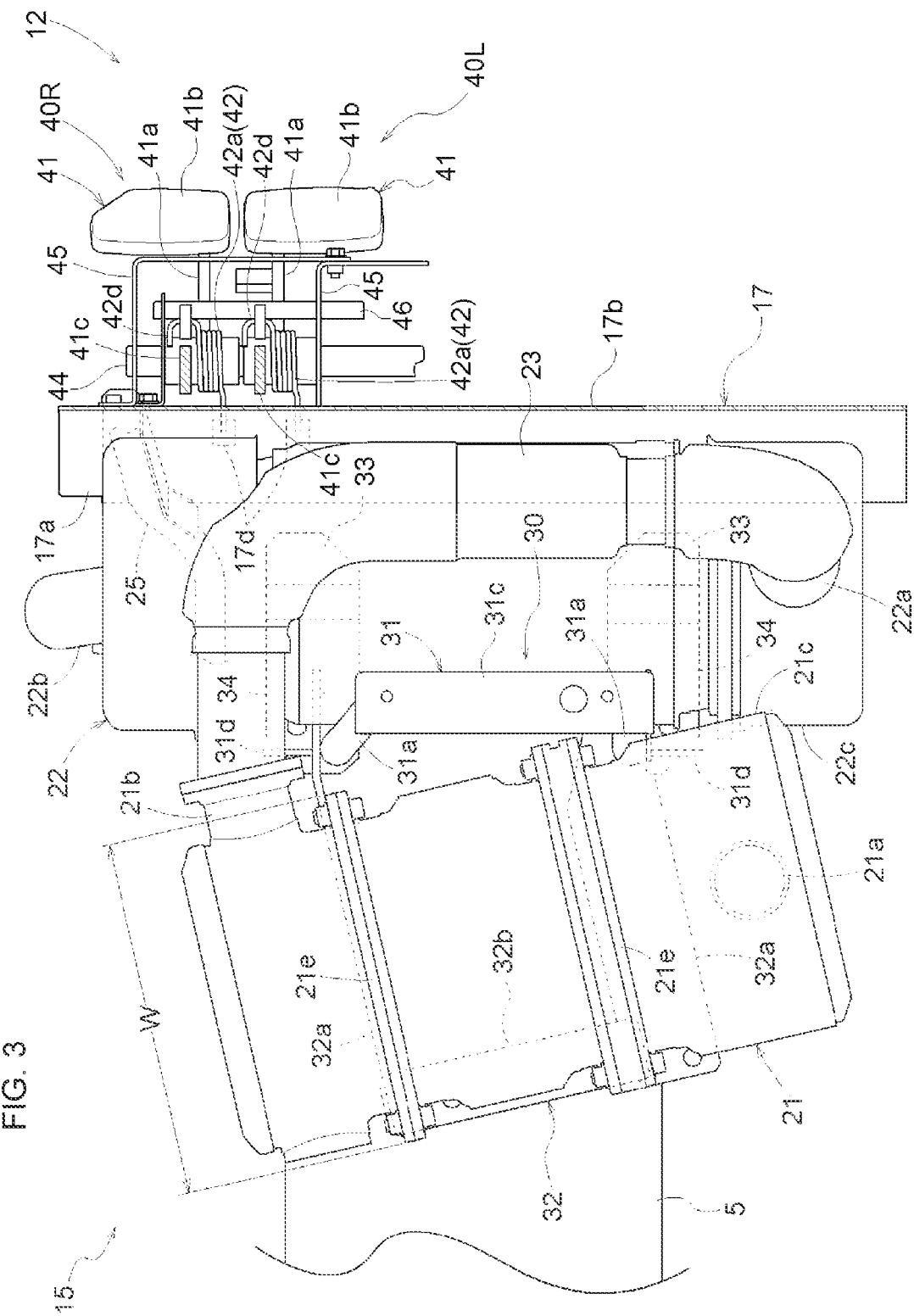
FIG. 3 is a plan view illustrating the first exhaust-gas cleaning device and the second exhaust-gas cleaning device.

The engine 5 is a diesel engine. As illustrated in FIGS. 2 and 3, the first exhaust-gas cleaning device 21 is provided above the engine 5 in a state wherein a long side of the first exhaust-gas cleaning device is substantially parallel to a vehicle-body horizontal direction (or a vehicle-body lateral width direction). A maximum length H in a vehicle-body vertical direction (or a vehicle-body up-down direction) of the first exhaust-gas cleaning device 21 is set to be shorter than a maximum length W in a vehicle-body longitudinal direction (or a vehicle-body front-back direction) of the first exhaust-gas cleaning device 21. As illustrated in FIGS. 2 and 3, an exhaust-gas suctioning portion 21a, which is provided to a part on one end side, in a vehicle-body horizontal width direction, of the first exhaust-gas cleaning device 21, and an exhaust-gas exhausting portion 5a, which is provided to the engine 5, are connected. An exhaust-gas discharging portion 21b is provided to a part on another end side, in the vehicle-body horizontal width direction, of the first exhaust-gas cleaning device 21. In one or more embodiments, the exhaust-gas suctioning portion 21a protrudes downward from a lower portion of the first exhaust-gas cleaning device 21 at an end portion on a vehicle-body left horizontal side of the first exhaust-gas cleaning device 21, and the exhaust-gas discharging portion 21b protrudes backward from an end portion on a vehicle-body right horizontal side of the first exhaust-gas cleaning device 21.

In the first exhaust-gas cleaning device 21, the exhaust gas exhausted by the engine 5 from the exhaust-gas exhausting portion 5a is suctioned by the exhaust-gas suctioning portion 21a into the apparatus, and diesel microparticles included in the suctioned exhaust gas are collected by a collection filter (not illustrated). This performs an exhaust-gas cleaning process of decreasing the diesel microparticles. The exhaust gas subjected to the cleaning process is discharged from the exhaust-gas discharging portion 21b.

As illustrated in FIGS. 2 and 3, the second exhaust-gas cleaning device 22 is provided behind the engine 5 in a state wherein a long side of the second exhaust-gas cleaning device is substantially parallel to the vehicle-body horizontal direction. An exhaust-gas introduction portion 22a, which is provided to a part on one end side, in the vehicle-body horizontal width direction, of the second exhaust-gas cleaning device 22, and the exhaust-gas discharging portion 21b of the first exhaust-gas cleaning device 21 are connected by a connecting pipe 23. An exhaust-gas discharging portion 22b is provided to a part on another end side, in the vehicle-body horizontal width direction, of the second exhaust-gas cleaning device 22. In one or more embodiments, the exhaust-gas introduction portion 22a is provided to an end portion on a vehicle-body left horizontal side of the second exhaust-gas cleaning device 22, and the exhaust-gas discharging portion 22b is provided to an end portion on a vehicle-body right horizontal side of the second exhaust-gas cleaning device 22.

In the second exhaust-gas cleaning device 22, the exhaust gas discharged by the first exhaust-gas cleaning device 21 from the exhaust-gas discharging portion 21b is supplied by the connecting pipe 23 to the exhaust-gas introduction portion 22a and introduced by the exhaust-gas introduction portion 22a into the apparatus, and the introduced exhaust gas is subjected to the cleaning process by a reducing agent. Specifically, aqueous urea as the reducing agent is injected into the introduced exhaust gas, hydrolyzing the exhaust gas. This performs an exhaust-gas cleaning process of decreasing nitrogen oxides included in the exhaust gas. The exhaust gas subjected to the cleaning process is exhausted from the exhaust-gas discharging portion 22b to a vehicle-body horizontal outer side.

As illustrated in FIG. 3, the first exhaust-gas cleaning device 21 is supported in an attachment attitude wherein the part on the other end side, in the vehicle-body horizontal width direction, is swung and displaced toward a vehicle-body front side with respect to the part on the one end side, in the vehicle-body horizontal width direction, in a state wherein the exhaust-gas suctioning portion 21a is a swinging shaft. That is, the first exhaust-gas cleaning device 21 is supported in an attitude wherein in a plan view, the longitudinal direction thereof is inclined relative to the vehicle-body horizontal width direction. As illustrated in FIG. 2, the exhaust-gas introduction portion 22a of the second exhaust-gas cleaning device 22 extends diagonally backward and upward from the second exhaust-gas cleaning device 22. A positional relationship between the exhaust-gas discharging portion 21b of the first exhaust-gas cleaning device 21 and the exhaust-gas introduction portion 22a of the second exhaust-gas cleaning device 22 can be made to be a positional relationship appropriate for adopting a connecting pipe 23 having no bellows or other adjustment means of adjusting the positional relationship between the exhaust-gas discharging portion 21b and the exhaust-gas introduction portion 22a. This can be done by bringing the first exhaust-gas cleaning device 21 and the second exhaust-gas cleaning device 22 in proximity to each other in the vehicle-body longitudinal direction and by directly connecting the exhaust-gas suctioning portion 21a of the first exhaust-gas cleaning device 21 to the exhaust-gas exhausting portion 5a of the engine 5.

As illustrated in FIGS. 2 and 3, a back portion 21c of the first exhaust-gas cleaning devices 21 is positioned on a vehicle-body back side of a back end portion of the engine 5. In a plan view, the back portion 21c of the first exhaust-gas cleaning device 21 and the second exhaust-gas cleaning device 22 overlap.

As illustrated in FIGS. 2 and 3, the partition member 17 that forms the partition between the engine compartment 15 and the driving unit 12 is provided across a back location of the second exhaust-gas cleaning device 22 and a lower location of the second exhaust-gas cleaning devices 22. The partition member 17 is configured so a part 17a— positioned in the lower location of the second exhaust-gas cleaning device 22—of the partition member 17 is positioned further toward a vehicle-body front side than a part 17b—positioned in the back location of the second exhaust-gas cleaning device 22—of the partition member 17. The part 17a—positioned in the lower location of the second exhaust-gas cleaning device 22—of the partition member 17 is provided with a portion in an inclined state that, in moving toward its lower end side, is positioned more to a vehicle-body front side. A footwell of the driving unit 12 can be extended below the second exhaust-gas cleaning device 22.

Figure 6:
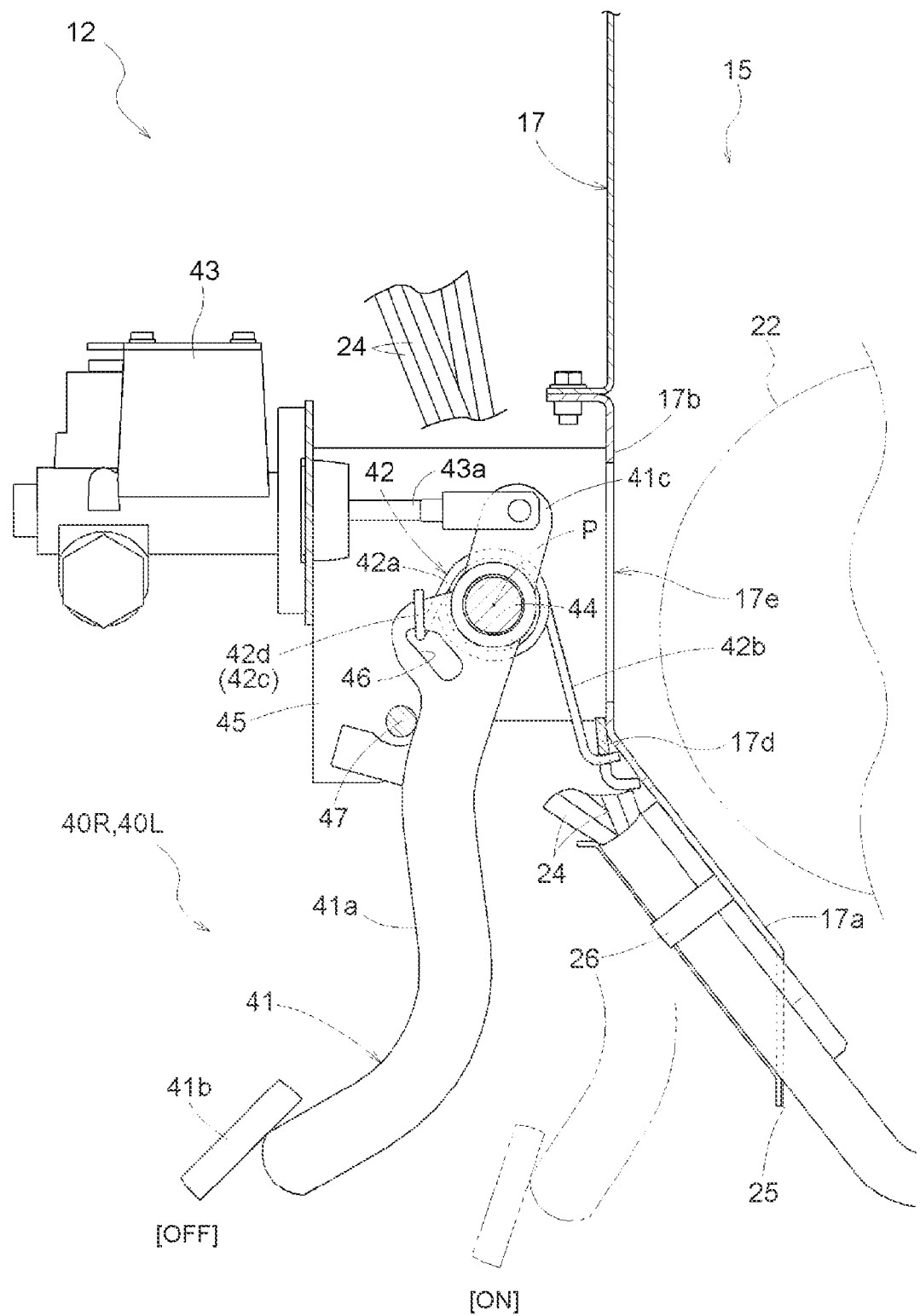
FIG. 6 is a right side view illustrating left and right brake operation devices.

As illustrated in FIG. 6, electrical wires 24 are provided across the engine compartment 15 and the driving unit 12. In one or more embodiments, a plurality of electrical wires 24 is provided. However, it is also possible for only one to be provided. The electrical wires 24 enter from the engine compartment 15 into the footwell of the driving unit 12 by passing below a part positioned in a central portion in the vehicle-body horizontal width direction of the partition member 17. The electrical wires 24 transmit information relating to actuation of the engine 5 to gauges of the driving unit 12. A portion of the electrical wires 24 that is positioned on a driving-unit side of the partition member 17 is wired in a state of conforming to the part 17a—positioned in the lower location of the second exhaust-gas cleaning device 22—of the partition member 17 in the footwell of the driving unit 12. The electrical wires 24 pass through a conduit 25. The conduit 25 is supported on the partition member 17 by a clamp 26.

[Support Member of Exhaust-Gas Cleaning Devices]

Figure 4:
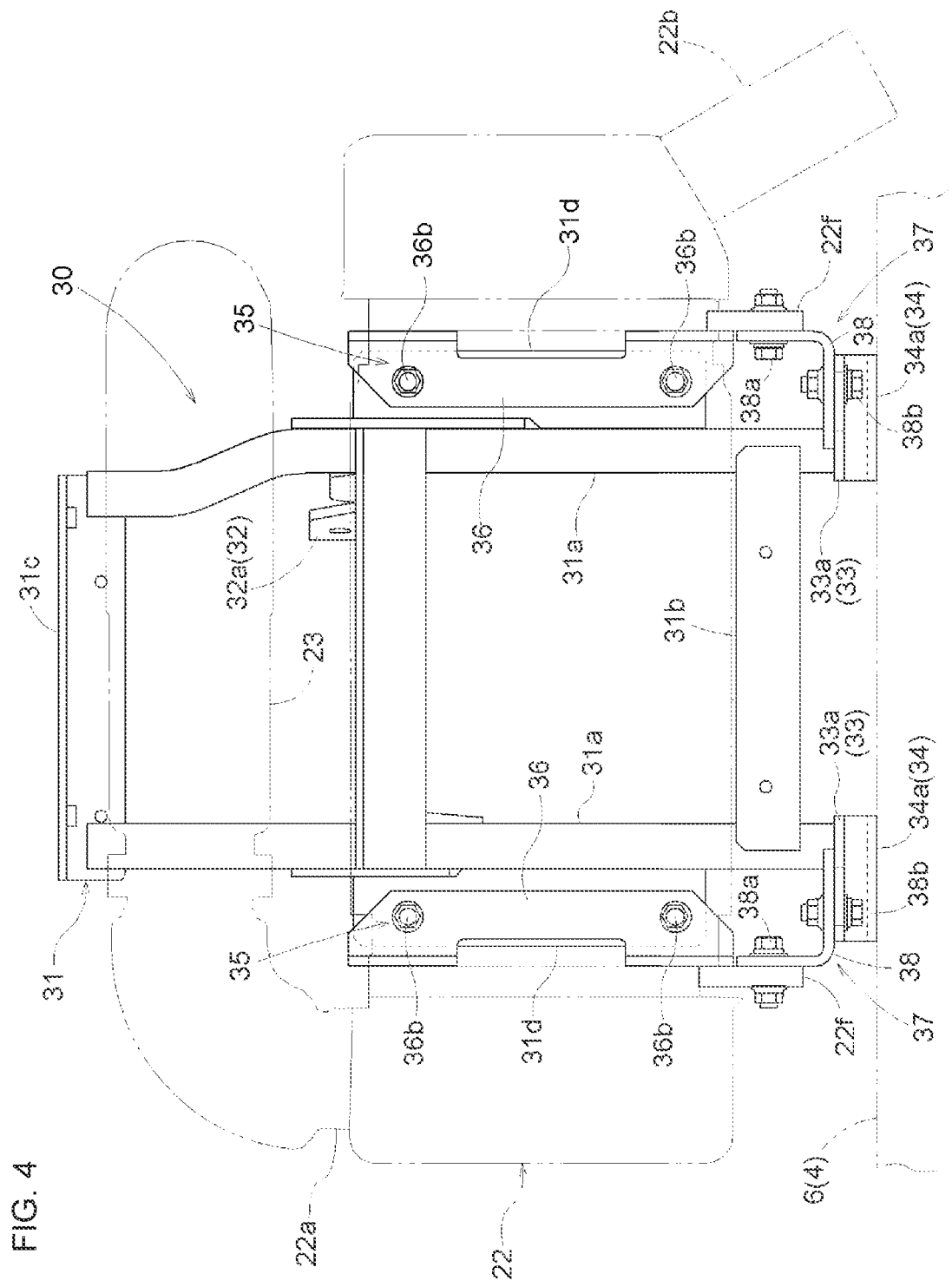
FIG. 4 is a back view illustrating a support member.

As illustrated in FIGS. 2, 3, and 4, the first exhaust-gas cleaning device 21 and the second exhaust-gas cleaning device 22 are supported on the vehicle body frame 4 via a support member 30. The first exhaust-gas cleaning device 21 and the second exhaust-gas cleaning device 22 are supported by the vehicle body frame 4 in a state wherein the positional relationship between the exhaust-gas discharging portion 21b of the first exhaust-gas cleaning device 21 and the exhaust-gas introduction portion 22a of the second exhaust-gas cleaning device 22 is set by the support member 30.

As illustrated in FIGS. 2, 3, 4, and 5, the support member 30 is provided with a strut portion 31 that extends upward from the vehicle body frame 4 in a state of conforming to a front portion 22c of the second exhaust-gas cleaning device 22 and supports the front portion 22c of the second exhaust-gas cleaning device 22, a support arm portion 32 that extends in a vehicle-body forward direction from an upper portion of the strut portion 31 in a state of conforming to a lower portion 21d of the first exhaust-gas cleaning device 21 and supports the lower portion 21d of the first exhaust-gas cleaning device 21, and a lower support portion 33 that is provided to a lower portion of the strut portion 31 and supports a lower portion 22d of the second exhaust-gas cleaning device 22.

Figure 5:
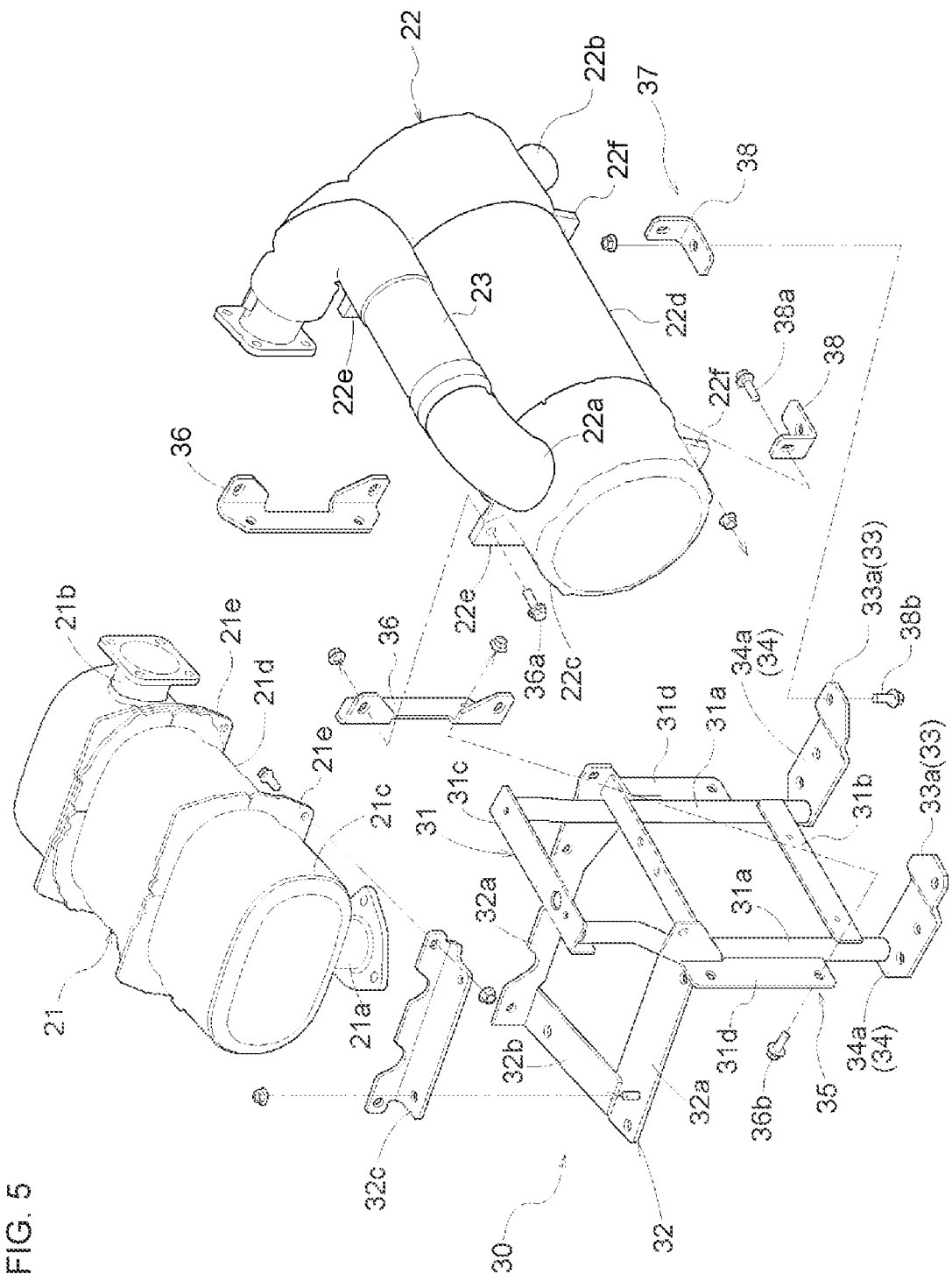
FIG. 5 is a perspective view of the support member in an exploded state.

As illustrated in FIGS. 2, 4, and 5, the strut portion 31 has a washer portion 34 provided to the lower portion of the strut portion 31 and is supported on the vehicle body frame 4 by the washer portion 34 being connected to the vehicle body frame 4. The connection of the washer portion 34 to the vehicle body frame 4 is performed by the flywheel housing 6 constituting the vehicle body frame 4. The flywheel housing 6 is positioned below the second exhaust-gas cleaning device 22 and can keep a length of the strut portion 31 short.

As illustrated in FIGS. 2, 4, and 5, the strut portion 31 is provided with left and right strut rods 31a lined up at an interval in the vehicle-body horizontal width direction. A lower strut-portion reinforcing rod 31b, which connects lower portions of the strut rods 31a, and an upper strut-portion reinforcing rod 31c, which connects upper portions of the strut rods 31a, are provided across the left and right strut rods 31a. The left and right strut rods 31a are constituted by steel pipes.

As illustrated in FIGS. 2, 4, and 5, a front support portion 31d supporting the second exhaust-gas cleaning device 22 is provided to each of the left and right strut rods 31a. The front portion 22c of the second exhaust-gas cleaning device 22 is supported by the strut portion 31 by front connecting portions 22e—provided in two locations, left and right, in the front portion 22c of the second exhaust-gas cleaning device 22—being connected to the front support portion 31d.

As illustrated in FIGS. 2, 4, and 5, washer plates 34a provided to respective lower portions of the left and right strut rods 31a are provided to the washer portion 34. In the washer portion 34, the left and right washer plates 34a being connected to the flywheel housing 6 by a plurality of connecting bolts provides a detachable connection to the flywheel housing 6.

As illustrated in FIGS. 2, 4, and 5, the lower support portion 33 is provided with lower support pieces 33a provided to the lower portions of the left and right strut rods 31a. The left and right lower support pieces 33a are provided to the strut rods 31a by being formed on the washer plates 34a. The lower support portion 33 is provided to the washer portion 34. The lower portion 22d of the second exhaust-gas cleaning device 22 is supported by the lower support portion 33 by lower connecting portions 22f—provided in two locations, left and right, in the lower portion 22d of the second exhaust-gas cleaning device 22— being connected to the lower support pieces 33a.

As illustrated in FIGS. 2, 4, and 5, the support arm portion 32 is provided with arm bodies 32a that extend in the vehicle-body forward direction from respective upper portions of the left and right strut rods 31a. An arm reinforcing rod 32b connecting the left and right arm bodies 32a is provided across distal end portions of the left and right arm bodies 32a. Among the left and right arm bodies 32a, the left arm body 32a is configured to connect via a relay member 32c to a lower connecting portion 21e provided to the lower portion 21d of the first exhaust-gas cleaning device 21. The right arm body 32a is configured to connect directly to the lower connecting portion 21e of the first exhaust-gas cleaning device 21.

[Configuration of Position Adjustment of Exhaust-Gas Cleaning Devices]

As illustrated in FIGS. 2, 4, and 5, the support member 30 is provided with a position adjustment portion 35 that can adjust a support position—in the vehicle-body vertical direction, the vehicle-body longitudinal direction, and the vehicle-body horizontal width direction—of the second exhaust-gas cleaning device 22 on the strut portion 31 and with a second position adjustment portion 37 that can adjust a support position—in the vehicle-body vertical direction, the vehicle-body longitudinal direction, and the vehicle-body horizontal width direction—of the second exhaust-gas cleaning device 22 on the lower support portion 33.

When there is a position shift between the exhaust-gas discharging portion 21b of the first exhaust-gas cleaning device 21 and the exhaust-gas introduction portion 22a of the second exhaust-gas cleaning device 22, so the positional relationship between the exhaust-gas discharging portion 21b and the exhaust-gas introduction portion 22a becomes appropriate and the exhaust-gas discharging portion 21b and the exhaust-gas introduction portion 22a can be appropriately connected by the connecting pipe 23 having no position adjustment function, the positional relationship between the exhaust-gas discharging portion 21b and the exhaust-gas introduction portion 22a can be adjusted by the position adjustment portion 35 and the second position adjustment portion 37.

Specifically, as illustrated in FIGS. 2, 4, and 5, the position adjustment portion 35 is provided with an adjustment member 36 positioned between the front connection portion 22e of the second exhaust-gas cleaning device 22 and the front support portion 31d of the strut portion 31, a first connecting bolt 36a connecting the front connecting portion 22e and the adjustment member 36, and a second connecting bolt 36b connecting the front support portion 31d and the adjustment member 36.

As illustrated in FIGS. 2, 4, and 5, the second position adjustment portion 37 is provided with a second adjustment member 38 positioned between the lower connecting portion 22f of the second exhaust-gas cleaning device 22 and the lower support piece 33a of the strut portion 31, a third connecting bolt 38a connecting the lower connecting portion 22f and the second adjustment member 38, and a fourth connecting bolt 38b connecting the lower support piece 33a and the second adjustment member 38.

A hole diameter of a through hole (not illustrated) of the adjustment member 36 whereinto the first connecting bolt 36a is inserted is made greater than an outer diameter of the first connecting bolt 36a for a configuration enabling position shifting of the front connecting portion 22e relative to the adjustment member 36. A through hole (not illustrated) of the adjustment member 36 whereinto the second connecting bolt 36b is inserted is made greater than an outer diameter of the second connecting bolt 36b for a configuration enabling position shifting of the adjustment member 36 relative to the front support portion 31d.

A hole diameter of a through hole (not illustrated) of the second adjustment member 38 whereinto the third connecting bolt 38a is inserted is made greater than an outer diameter of the third connecting bolt 38a for a configuration enabling position shifting of the adjustment member 36 relative to the front support portion 31d. A hole diameter of a through hole (not illustrated) of the second adjustment member 38 whereinto the fourth connecting bolt 38b is inserted is made greater than an outer diameter of the fourth connecting bolt 38b for a configuration enabling position shifting of the adjustment member 36 relative to the front support portion 31d.

In the position adjustment portion 35, among the first connecting bolt 36a, the second connecting bolt 36b, the third connecting bolt 38a, and the fourth connecting bolt 38b, tightening of a connecting bolt corresponding to desired position adjustment is loosened. Performing an operation of moving the second exhaust-gas cleaning device 22 shifts the position of the second exhaust-gas cleaning device 22 relative to the support member 30. This changes the support position—in the vehicle-body vertical direction, the vehicle-body longitudinal direction, and the vehicle-body horizontal width direction—of the second exhaust-gas cleaning device 22 on the strut portion 31 in a manner corresponding to the operation that is performed of moving the second exhaust-gas cleaning device 22.

In the second position adjustment portion 37, among the first connecting bolt 36a, the second connecting bolt 36b, the third connecting bolt 38a, and the fourth connecting bolt 38b, tightening of a connecting bolt corresponding to desired position adjustment is loosened. Performing an operation of moving the second exhaust-gas cleaning device 22 shifts the position of the second exhaust-gas cleaning device 22 relative to the support member 30. This changes the support position—in the vehicle-body vertical direction, the vehicle-body longitudinal direction, and the vehicle-body horizontal width direction—of the second exhaust-gas cleaning device 22 on the lower support portion 33 in a manner corresponding to the operation that is performed of moving the second exhaust-gas cleaning device 22.

[Configuration of Driving Unit]

Figure 8:
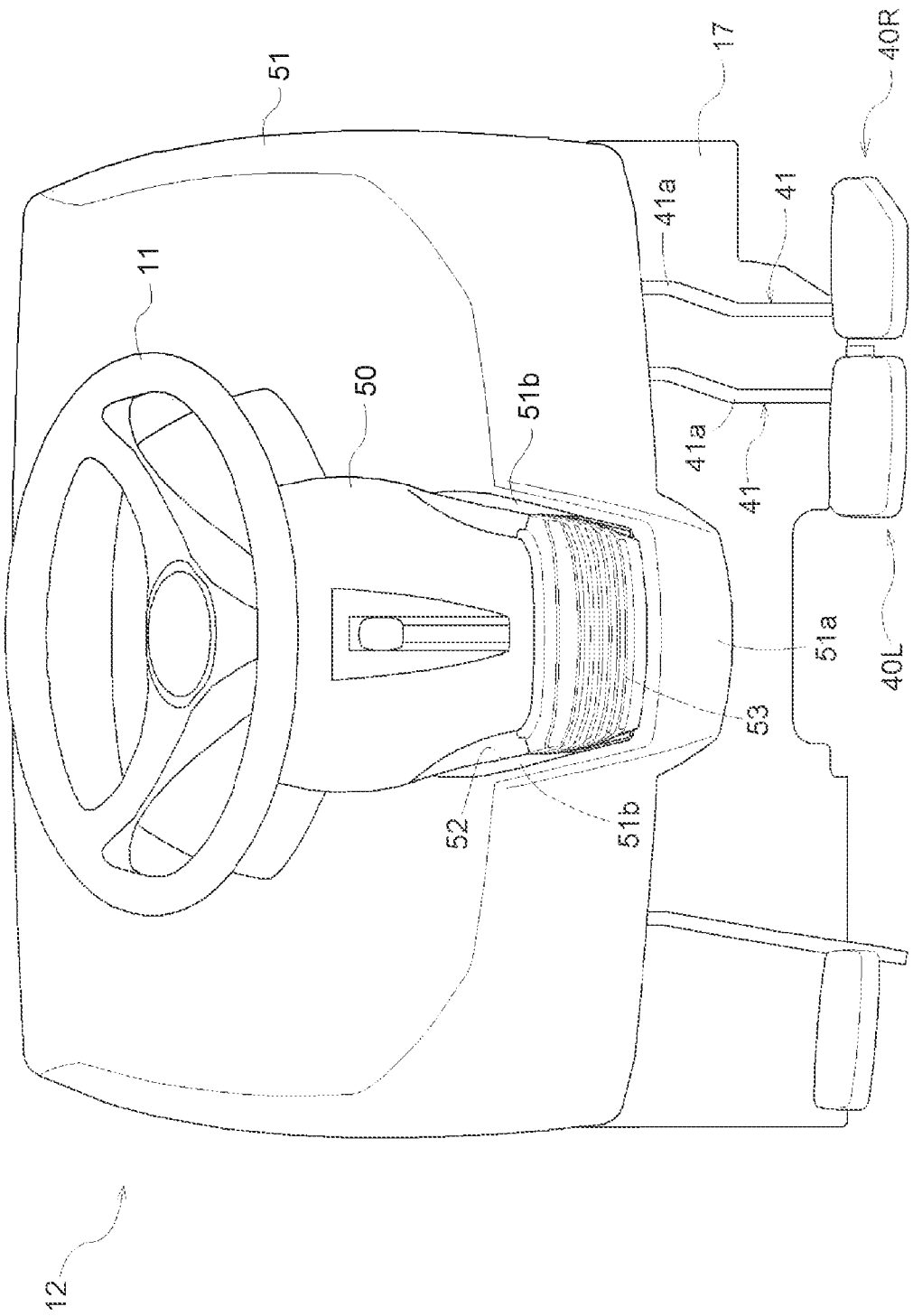
FIG. 8 is a back view illustrating a steering-post cover and a panel cover.

As illustrated in FIG. 1, the driving unit 12 is provided behind the engine compartment 15. As illustrated in FIGS. 1, 3, and 8, the driving unit 12 is provided with the driver's seat 10, the steering wheel 11 whereby the steering operation of the front wheels 1 is performed, a left brake operation unit 40L whereby brakes (not illustrated) for the left back wheel are operated, and a right brake operation unit 40R whereby brakes (not illustrated) for the right back wheel are operated.

[Configurations of Left Brake Operation Unit and Right Brake Operation Unit]

As illustrated in FIG. 8, the left brake operation unit 40L and the right brake operation unit 40R are provided to the right and below the steering wheel 11. As illustrated in FIGS. 3, 6, and 8, the left brake operation unit 40L and the right brake operation unit 40R are each provided with a brake pedal 41, a return spring 42 that subjects the brake pedal 41 to an operation of being returned to a brake off position ("off"), and a master cylinder 43 connected to the brake pedal 41.

As illustrated in FIG. 6, the brake pedal 41 is provided with a pedal arm portion 41a and with a footboard 41b provided at a lower end portion of the pedal arm portion 41a. A support shaft 44 is provided at an upper portion of the pedal arm portion 41a. The support shaft 44 is supported by a support portion 45 provided to the traveling vehicle body 3. The brake pedal 41 is supported on the traveling vehicle body 3 in a state of being able to swing between the brake off position ("off") and a braking position ("on") by using a shaft core P of the support shaft 44 as a swinging fulcrum. The brake pedal 41 is positioned to the brake off position ("off") by the pedal arm portion 41*a* abutting a stopper 47.

As illustrated in FIG. 6, the partition member 17 forming the partition between the engine compartment 15 and the driving unit 12 is disposed further toward a vehicle-body front side than the brake pedal 41. The return spring 42 is engaged to the pedal arm portion 41*a* and a spring support portion 17*d* provided to the partition member 17. The return spring 42 biases the brake pedal 41 to swing to the brake off position ("off") by using the partition member 17 as a reaction-force member.

As illustrated in FIG. 6, the partition member 17 is configured so the part 17*a*, which corresponds to the footboard 41*b*, of the partition member 17 is disposed further toward a vehicle-body front side than the part 17*b*, which corresponds to the support shaft 44, of the partition member 17. A front portion of the footwell of the driving unit 12 can be extended forward past the support shaft 44.

As illustrated in FIG. 6, the master cylinder 43 is provided on a vehicle-body back side of the support shaft 44 of the brake pedal 41. The master cylinder 43 is fixed in a detachable manner to the support portion 45. A slidable operation shaft 43*a* of the master cylinder 43 and an operation arm portion 41*c* provided to the brake pedal 41 are interconnected. The operation arm portion 41*c* extends from the pedal arm portion 41*a* toward an opposite side of a side whereon the footboard 41*b* is positioned relative to the support shaft 44.

In both the left brake operation unit 40L and the right brake operation unit 40R, when the brake pedal 41 is subjected to a stepping operation against the return spring 42 and enters the braking position ("on"), the operation shaft 43*a* of the master cylinder 43 is subjected to a sliding operation to a pushed-in side by the operation arm portion 41*c*. The master cylinder 43 supplies operational hydraulic pressure to the brakes (not illustrated), and the brakes perform an operation of switching to a braking state. When the stepping operation of the brake pedal 41 is released, the brake pedal 41 is subjected to an operation of returning to the brake off position ("off") by the return spring 42, and the operation shaft 43*a* of the master cylinder 43 is subjected to a sliding operation to a pulled-out side by the operation arm portion 41*c*. The imparting of the operational hydraulic pressure by the master cylinder 43 to the brakes is released, and the brakes perform an operation of switching to an initial state.

[Configuration of Return Spring]

As illustrated in FIGS. 3 and 6, the return spring 42 is constituted by a torsion coil spring and is provided with a coil portion 42*a*, an arm (a first arm) 42*b* extending from one end side of the coil portion 42*a*, and an arm (a second arm) 42*c* extending from another end side of the coil portion 42*a*. The coil portion 42*a* is fitted onto the support shaft 44, and the return spring 42 is supported by the support shaft 44. The arm 42*b* on the one end side is engaged to the spring support portion 17*d* of the partition member 17. The arm 42*c* on the other end side is engaged to the pedal arm portion 41*a*.

As illustrated in FIG. 6, a bent end portion 42*d* engaged to the pedal arm portion 41*a* is provided to the arm 42*c* on the other end side. A through hole 46 whereto the bent end portion 42*d* is engaged is provided to the pedal arm portion 41*a*. A shape of the through hole 46 is made to be a shape whereinto the bent end portion 42*d*, which moves along the shaft core P of the support shaft 44, can be inserted. The return spring 42 and the brake pedal 41 can be assembled by the following assembly outline.

Figure 7:
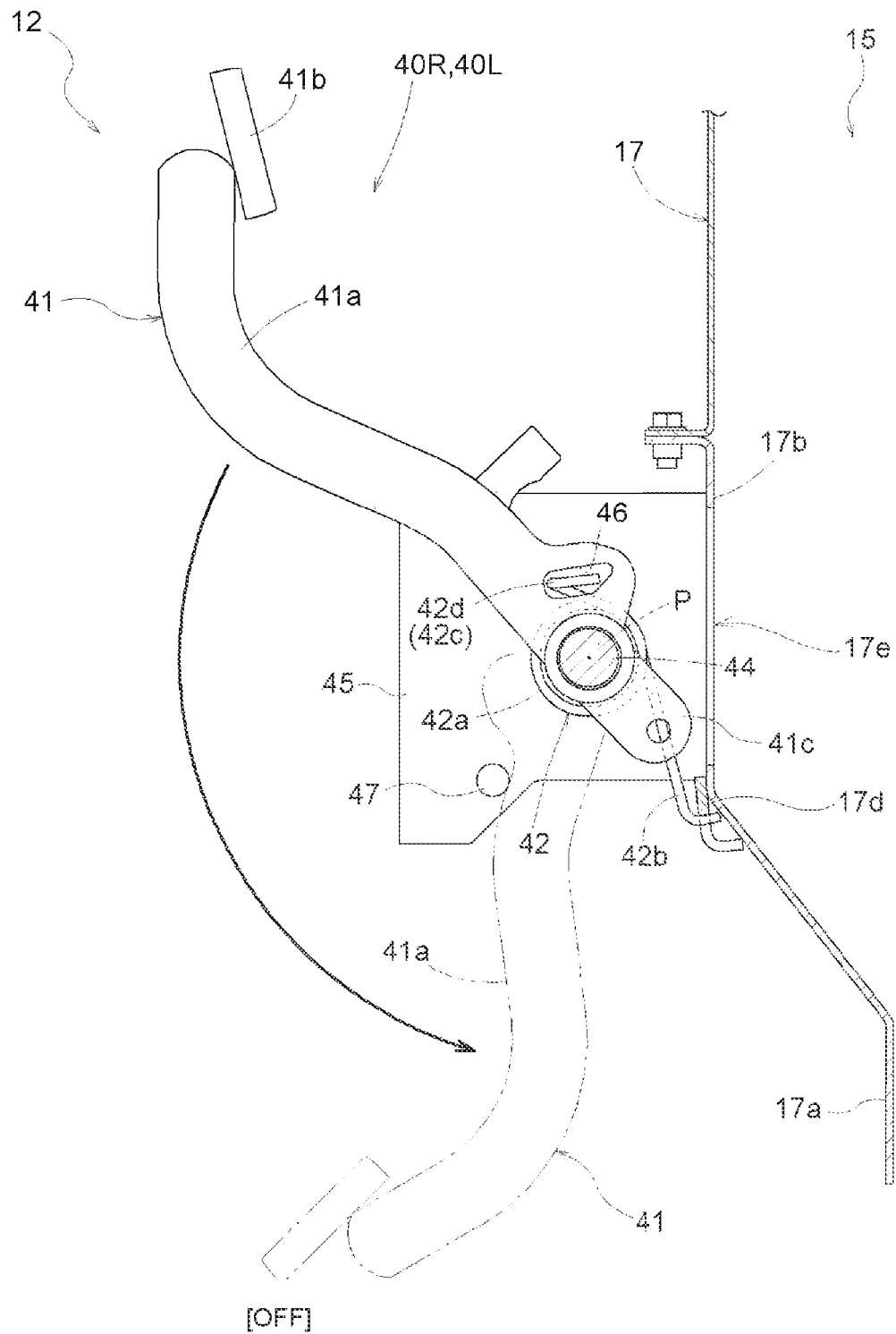
FIG. 7 is an explanatory diagram illustrating a summary of assembly of a brake pedal.

As illustrated in FIG. 7, the coil portion 42*a* fits the return spring 42 onto the support shaft 44, and the arm 42*b* on the one end side is placed in a state of being engaged to the partition member 17. The return spring 42 is in a free state. The stopper 47 is removed from the support portion 45. The brake pedal 41 is attached to the support shaft 44 and swung up, and the brake pedal 41 is operated to an attitude of opposing the support shaft, wherein the footboard 41*b* is positioned in a position higher than when the brake pedal 41 is positioned in the brake off position ("off"). The brake pedal 41 in this attitude of opposing the support shaft is guided to the support shaft 44 and moved toward the return spring 42. By moving the brake pedal 41, the bent end portion 42*d* of the return spring 42 moves toward the pedal arm portion 41*a* in a direction along the shaft core p of the support shaft 44, is inserted into the through hole 46 from an inner side of the pedal arm portion 41*a*, and moves to an outer side of the pedal arm portion 41*a*. Next, the brake pedal 41 is swung down. At this time, the operation arm portion 41*c* enters a slit 17*e* provided in the partition member 17. The stopper 47 is attached to the support portion 45, and the brake pedal 41 is moved to the brake off position ("off"). This causes the brake pedal 41 to be stopped by the stopper 47. As illustrated in FIG. 6, the bent end portion 42*d* engages to the pedal arm portion 41*a*, the return spring 42 is provided with an elastic restoring force, and the brake pedal 41 enters a state of being biased and swung to the brake off position ("off") by the return spring 42. The slit 17*e* is closed off once assembly of the brake pedal 41 is finished.

[Configurations of Steering-Post Cover and Panel Cover]

The steering wheel 11 is supported in a state of being able to change positions in the longitudinal direction and the vehicle-body vertical direction. As illustrated in FIG. 8, a steering-post cover 50 is inserted into a through hole 52 of a panel cover 51 supported on the traveling vehicle body 3. When the steering wheel 11 changes positions in the longitudinal direction, the steering-post cover 50 follows the steering wheel 11 and swings in the longitudinal direction relative to the panel cover 51. A bellows-shaped expandable cover 53 is connected across a proximal-side lower portion of the steering-post cover 50 and a lower portion 51*a* of the panel cover 51. The expandable cover 53 expands and contracts according to the swinging of the steering-post cover 50 but, regardless of the swinging of the steering-post cover 50, places a gap between the steering-post cover 50 and the lower portion 51*a* of the panel cover 51 in a closed state. Between a part opposing a distal-side wall portion of the steering-post cover 50 of the panel cover 51 and the distal-side wall portion of the steering-post cover 50, a gap that allows the steering-post cover 50 to swing is provided. However, above the gap and on the distal-side wall portion of the steering-post cover 50, a bulging portion that bulges toward a cover outer side and makes the gap difficult to see from above is provided. In the panel cover 51, a face portion 51*b* corresponding to a side portion of the steering-post cover 50 is raised to the proximal side. Even if the steering-post cover 50 swings, the face portion 51*b* makes it difficult to see the gap between the steering-post cover 50 and the panel cover 51 on a horizontal side of the steering-post cover 50.

Figure 9:
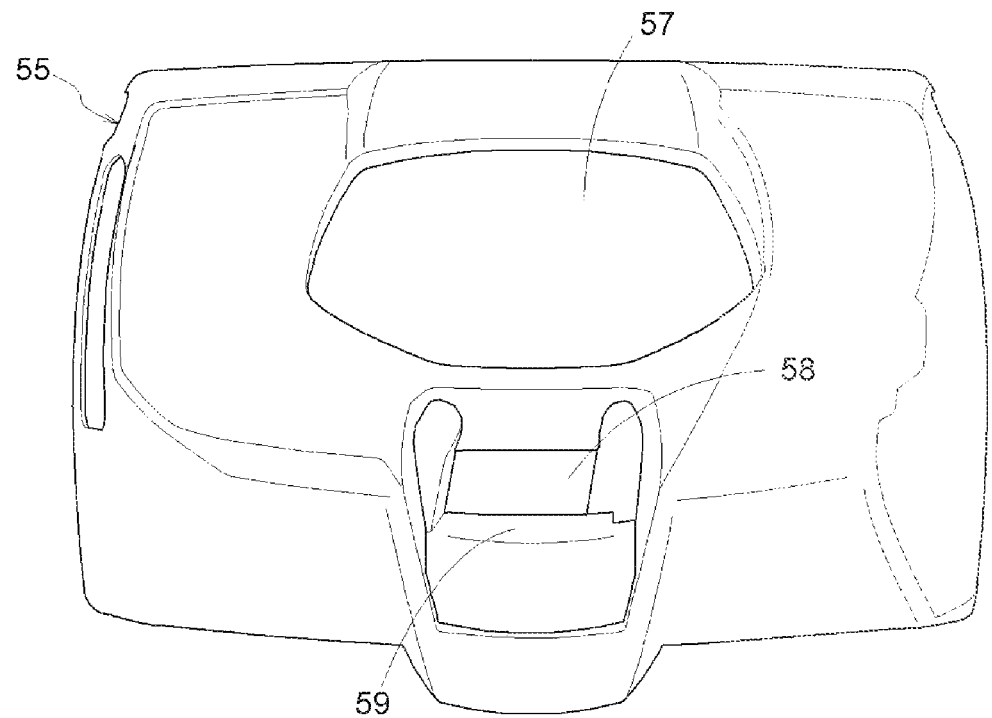
FIG. 9 is a back view illustrating a panel cover provided with another example of one or more embodiments.
Figure 10:
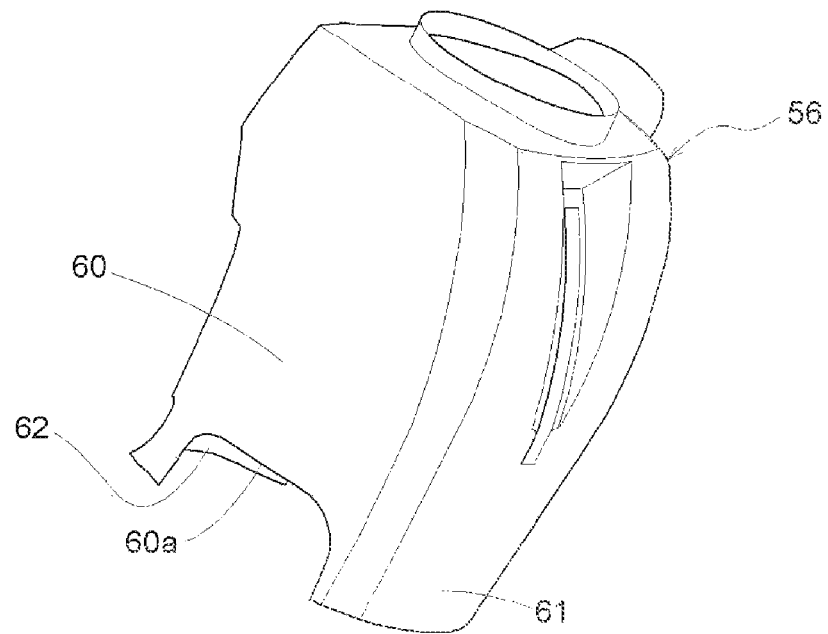
FIG. 10 is a perspective view of a steering-post cover provided with another example of one or more embodiments.

Other Embodiments (1) FIG. 9 is a back view of a panel cover 55 provided with another example of one or more embodiments. FIG. 10 is a perspective view of a steering-post cover 56 provided with another example of one or more embodiments. In the panel cover 55 provided with another example, below a through hole 57 whereinto the steering-post cover 56 is inserted, an opening 58 and a proximal wall 59 extending upward from a lower edge portion of the opening 58 are provided. In the steering-post cover 56, on a proximal-side lower portion, a proximal extended portion 61 that extends lower than a lower end 60a of a horizontal wall portion 60 is provided, and on a distal-side lower portion, a distal extended portion 62 that extends lower than the lower end 60a of the horizontal wall portion 60 is provided. The proximal wall 59, the proximal extended portion 61, and the distal extended portion 62 serve as hiding walls that make it difficult to see into an area below the panel cover 55 via a gap arising between the steering-post cover 56 and the panel cover 55 on a proximal side and horizontal side of the steering-post cover 56.

(2) The above embodiments illustrate an example wherein the partition member 17 is configured so the part 17a corresponding to the footboard 41b of the brake pedal 41 is disposed further toward the vehicle-body front side than the part 17b corresponding to the support shaft 44 of the brake pedal 41. However, the present invention is not limited thereto. For example, the part 17a corresponding to the footboard 41b and the part 17b corresponding to the support shaft 44 may be positioned in the same position in the vehicle-body longitudinal direction, or the part 17a corresponding to the footboard 41b may be positioned on a vehicle-body back side of the part 17b corresponding to the support shaft 44.

(3) The above embodiments illustrate an example wherein the return spring 42 is constituted by a coil spring. However, the present invention is not limited thereto, and this may be a tension spring.

(4) The above embodiments illustrate an example of a configuration wherein the bent end portion 52d of the return spring 42 can be inserted into the through hole 52 of the pedal arm portion 41a. However, the present invention is not limited thereto, and the bent end portion 52d may simply be engaged to the through hole 52.

INDUSTRIAL APPLICABILITY

The present invention can be applied in tractors provided with an engine compartment and with a driving unit that is provided behind the engine compartment and has a brake pedal, a master cylinder operated by the brake pedal, and a return spring that biases the brake pedal to swing back to a brake off position.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A tractor comprising:
an engine compartment;
a driving unit disposed behind the engine compartment; and
a partition that separates the engine compartment and the driving unit from each other, wherein
the driving unit comprises:
a brake pedal that comprises:
a support shaft; and
a pedal arm portion;
a master cylinder that is operated by the brake pedal and disposed further toward a back side of the tractor than the support shaft; and
a return spring that biases the brake pedal to swing back to an initial brake off position; and
the partition is disposed further toward a front side of the tractor than the brake pedal, and
the return spring is engaged to the partition and to the pedal arm portion.

2. The tractor of claim 1, wherein
the brake pedal further comprises:
a footboard, and
the partition includes a portion that corresponds to the footboard and is disposed further toward the front side than a portion of the partition corresponding to the support shaft.

3. The tractor of claim 1, wherein
the return spring is composed of a torsion coil spring comprising a coil portion, and
the torsion coil spring is supported by the support shaft with the coil portion engaged with the support shaft.

4. The tractor of claim 3, wherein
a first arm extending from one end side of the torsion coil spring is engaged with the partition and a second arm extending from another end side of the torsion coil spring is engaged with the pedal arm portion,
the second arm includes:
a bent end portion that engages with the pedal arm portion,
the pedal arm portion includes:
a through hole with which the bent end portion engages, and
the bent end portion can be inserted into the through hole in a direction along a shaft core of the support shaft.

5. The tractor of claim 1, wherein
the partition includes a vertical portion and an inclined portion inclining toward the engine compartment disposed further toward the front side than the partition.

* * * * *